US012278846B2

(12) United States Patent
Vandenberg-Rodes et al.

(10) Patent No.: US 12,278,846 B2
(45) Date of Patent: Apr. 15, 2025

(54) METHODS AND APPARATUSES TO PROVIDE INFORMATION SECURITY TO AN ENTITY BY USING MULTIPLE CLOUD-BASED APPLICATION SERVICES

(71) Applicant: Obsidian Security, Inc., Newport Beach, CA (US)

(72) Inventors: Alexander Vandenberg-Rodes, Costa Mesa, CA (US); Steven Litvack-Winkler, Costa Mesa, CA (US); Brian Kwan Fong Lau, Huntington Beach, CA (US); Neha Duggal, San Carlos, CA (US); Naresh Chebolu, San Jose, CA (US); Simon Lutterbie, Philadelphia, PA (US); David Samuel Elston, Newport Beach, CA (US)

(73) Assignee: Obsidian Security, Inc., Newport Beach, CA (US)

( * ) Notice: Subject to any disclaimer, the term of this patent is extended or adjusted under 35 U.S.C. 154(b) by 0 days.

(21) Appl. No.: 18/752,409

(22) Filed: Jun. 24, 2024

(65) Prior Publication Data
US 2024/0430307 A1 Dec. 26, 2024

Related U.S. Application Data

(60) Provisional application No. 63/509,695, filed on Jun. 22, 2023.

(51) Int. Cl.
*H04L 9/40* (2022.01)
(52) U.S. Cl.
CPC .......... *H04L 63/20* (2013.01); *H04L 63/1425* (2013.01)

(58) Field of Classification Search
CPC .......................... H04L 63/20; H04L 63/1425
USPC ............................................................ 726/1
See application file for complete search history.

(56) References Cited

U.S. PATENT DOCUMENTS

| 10,621,347 B2* | 4/2020 | Takata ............... H04L 63/1441 |
| 10,798,112 B2* | 10/2020 | Siddiqui ............... G06F 21/577 |
| 11,102,232 B2* | 8/2021 | Kozloski ............... H04L 9/3239 |
| 11,314,841 B1* | 4/2022 | Montgomery .......... H04L 67/55 |
| 11,792,234 B1* | 10/2023 | Robinson ............... H04L 63/20 |
| | | 726/1 |
| 2005/0015624 A1* | 1/2005 | Ginter ................... H04L 63/145 |
| | | 726/4 |

(Continued)

OTHER PUBLICATIONS

Co-pending U.S. Appl. No. 18/113,983, inventors Naresh; Chebolu et al., filed Feb. 24, 2023.

(Continued)

*Primary Examiner* — Badri Champakesan
(74) *Attorney, Agent, or Firm* — COOLEY LLP

(57) ABSTRACT

In an embodiment, a method includes receiving, via a processor, identity provider (IDP)/single sign on (SSO) data that is associated with an IDP and an SSO entity. The IDP and the SSO entity manage access to a plurality of cloud-based applications for a plurality of user compute devices for a plurality of users. The method further includes generating, via the processor and without accessing the plurality of cloud-based applications, analytics based on the IDP/SSO data. The method further includes causing, via the processor, an action based on the analytics.

15 Claims, 8 Drawing Sheets

(56) References Cited

U.S. PATENT DOCUMENTS

| | | | |
|---|---|---|---|
| 2015/0172321 A1* | 6/2015 | Kirti | H04L 63/1416 |
| | | | 726/1 |
| 2016/0337400 A1* | 11/2016 | Gupta | H04L 63/1416 |
| 2018/0027006 A1* | 1/2018 | Zimmermann | H04L 63/0227 |
| | | | 726/11 |
| 2019/0251250 A1* | 8/2019 | Nandakumar | G06F 21/46 |
| 2019/0349369 A1* | 11/2019 | Bengtson | H04L 67/52 |
| 2020/0092333 A1* | 3/2020 | Šebesta | H04L 63/14 |
| 2020/0128047 A1 | 4/2020 | Biswas et al. | |
| 2020/0259852 A1* | 8/2020 | Wolff | H04L 67/10 |
| 2021/0160231 A1 | 5/2021 | Kumar et al. | |
| 2022/0116415 A1* | 4/2022 | Burgis | H04L 67/51 |
| 2022/0217133 A1* | 7/2022 | Montgomery | H04L 63/0823 |
| 2023/0039079 A1* | 2/2023 | Philip | G06F 21/6281 |
| 2023/0388282 A1* | 11/2023 | Lin | H04L 63/102 |

OTHER PUBLICATIONS

International Search Report and Written Opinion for PCT Application No. PCT/US2024/035299 mailed Sep. 30, 2024, 16 pages.

* cited by examiner

Receive identity provider (IDP) / single sign on (SSO) data that is associated with an IDP and an SSO entity, the IDP and the SSO entity managing access to a plurality of cloud-based applications for a plurality of user compute devices for a plurality of users
402

Generate, without accessing the plurality of cloud-based applications, analytics based on the IDP/SSO data
404

Cause an action based on the analytics
406

Receive first IDP/SSO data that is associated with a first IDP and a first SSO entity, the first IDP and the first SSO entity configured to manage access to a first plurality of cloud-based applications for a first plurality of user compute devices for a first plurality of user 502

↓

Generate a first set of analytics based on the first IDP/SSO data 504

↓

Cause a first action based on the first set of the analytics 506

↓

Receive second IDP/SSO data that is (1) different than the first IDP/SSO data and (2) associated with a second IDP and a second SSO entity, the second IDP and the second SSO entity managing access to a second plurality of cloud-based applications for a second plurality of user compute devices for a second plurality of users, the second plurality of cloud-based applications different than the first plurality of cloud-based applications, the second plurality of user compute devices different than the first plurality of user compute devices, the second plurality of users different than the first plurality of users 508

↓

Generate a second set of analytics based on the second IDP/SSO data 510

↓

Cause a second action based on the second set of analytics 512

FIG. 5

METHODS AND APPARATUSES TO PROVIDE INFORMATION SECURITY TO AN ENTITY BY USING MULTIPLE CLOUD-BASED APPLICATION SERVICES

CROSS REFERENCE TO RELATED APPLICATION

This is application claims priority to and the benefit of U.S. Provisional Patent Application No. 63/509,695, filed Jun. 22, 2023 and titled "METHODS AND APPARATUSES TO PROVIDE INFORMATION SECURITY TO AN ENTITY BY USING MULTIPLE CLOUD-BASED APPLICATION SERVICES," the contents of which are incorporated by reference in its entirety.

FIELD

One or more embodiments are related to methods and apparatuses to provide information security to an entity by using multiple cloud-based application services.

BACKGROUND

Many entities use hundreds of Software as a Service (SaaS) applications. Even with the increase in services provided by known cybersecurity software, a gap can exist in cybersecurity-related visibility across those hundreds of SaaS applications. That said, the SaaS applications and data generated by the SaaS applications are sometimes only accessible to a limited number of users (e.g., for privacy reasons), making cybersecurity-related visibility across the SaaS applications more difficult. Therefore, analyzing and visualizing how all the SaaS applications are used by an entity without having to access the SaaS applications themselves can be desirable.

SUMMARY

In an embodiment, a method includes receiving, via a processor, identity provider (IDP)/single sign-on (SSO) data that is associated with an IDP and an SSO entity. The IDP and the SSO entity manage access to a plurality of cloud-based applications for a plurality of user compute devices for a plurality of users. The method further includes generating, via the processor and without accessing the plurality of cloud-based applications, analytics based on the IDP/SSO data. The method further includes causing, via the processor, an action based on the analytics.

BRIEF DESCRIPTION OF THE DRAWINGS

FIGS. 3A-3C show example screenshots of analytics being displayed via a GUI, according to an embodiment.

FIG. 4 shows a flowchart of a method to generate analytics based on IDP/SSO data, according to an embodiment.

FIG. 5 shows a flowchart of a method to generate different analytics based on different IDP/SSO data for different groups of users, according to an embodiment.

DETAILED DESCRIPTION

Figure 1:
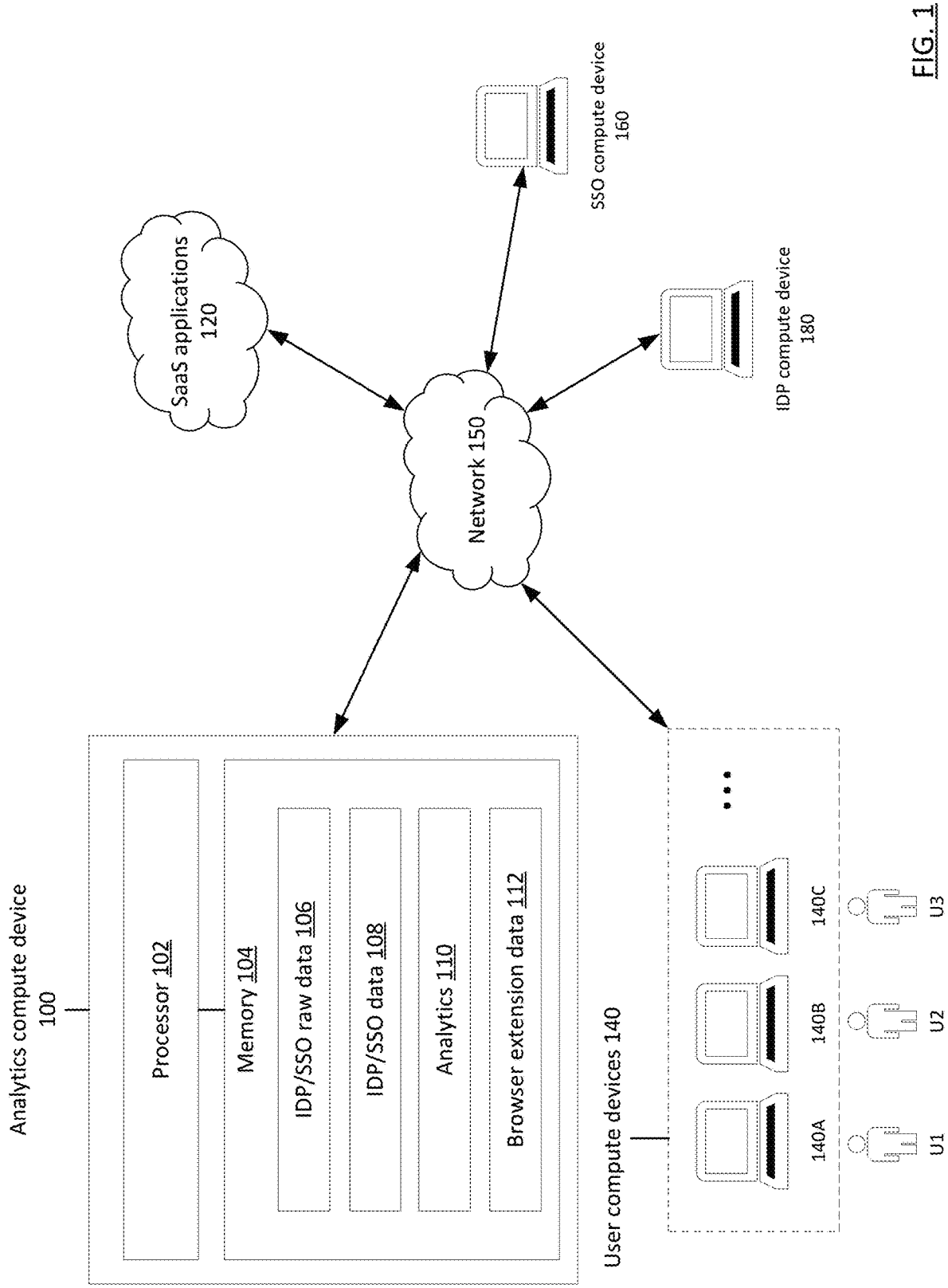
FIG. 1 shows a system block diagram of a system to generate analytics based on IDP/SSO data, according to an embodiment.

An entity (e.g., an organization, an employer, a company, etc.) can be made up of multiple users. Those users may use their compute devices to access different SaaS applications. When accessing a SaaS application, the SaaS application may use (e.g., communicate with) only an identity provider (IDP), only a single sign-on (SSO) service, or a combination of an IDP and a SSO service to verify that the user can access the SaaS application. For example, a user (e.g., employee) of an entity (e.g., employer) may use his compute device (e.g., work laptop, work phone, and/or the like) to log in to a SaaS application (e.g., the chat application used by the entity, the email application used by the entity, and/or the like). In response to the login attempt, the compute device associated with (e.g., running) the SaaS application (i.e., SaaS compute device) may send an electronic signal to the compute device associated with (e.g., running) the SSO service (i.e., SSO compute device) to verify the user's account/identity. If the SSO compute device determines that the user has not yet signed in, the SSO compute device can prompt the user to sign in via their compute device. In response, the user's compute device can open the SSO login page, which can include fields for the user to provide their identification information (e.g., enter his username and password). If, however, the SSO compute device determines that the user has previously signed in, the SSO compute device automatically logs the user in and doesn't prompt the user to sign in via their compute device. If the entity uses multifactor authentication (MFA), the user can also provide the MFA information (e.g., short code, biometric, and/or the like). Thereafter, the SSO compute device can send a request (e.g., security assertion markup language (SAML) request) to a compute device associated with an IDP (i.e., IDP compute device) and used by the entity. The IDP compute device can send a request (e.g., SAML request) confirming the user's identity to the SSO compute device. The SSO compute device can then send a verification (e.g., SAML assertion) to the SaaS compute device. The user can then use their compute device to access the SaaS application. Of course, the aforementioned is one example of how an IDP compute device and SSO compute device can be used to login to a SaaS application, and variations can exist. For example, in some implementations, the login process uses one of an SSO compute device or an IDP compute device, but not the other. As another example, in some implementations, login requests can be an IDP-initiated SSO. As another example, in some implementations, login requests can be a (service provider) SP-initiated SSO; for example, the service provider can be a SaaS application.

In some implementations, during the process of logging into a SaaS application using an IDP compute device and/or an SSO compute device, a separate compute device, referred to herein as an analytics compute device, can receive this data in the form of IDP/SSO data to generate analytical insights.

Therefore, some implementations are related to leveraging an IDP/SSO stream of data from a IDP compute device and/or an SSO compute device to analyze, determine, and visualize posture and threat insights across some or all federated and/or unfederated SaaS applications of an entity associated with users and their compute devices without accessing the SaaS applications themselves. Said similarly, the data stream associated with an entity's IDP/SSO services can be captured to analyze, determine, and visualize the entity's environment and cybersecurity threat insights. With this information, an entity can quickly determine and visualize, for example: all federated SaaS applications that exist in an entity; user counts, such as active and inactive users; trends in user activity; IdP groups for that SaaS application; failed login attempts; activity timeline along with insights into if multifactor authentication (MFA) was applied for that particular login event; administrator activity to indicate users at an entity added and deleted in the last 30 days, along with who added/deleted; users at an entity that can log into a specific SaaS application service without MFA; list of SaaS apps that a user at a customer has access to; and/or the like.

Some implementations are related to collecting IDP/SSO data from a variety of sources via the API(s) of an entity's IDP/SSO. In some implementations, an analytics compute device can repeatedly (e.g., continuously, periodically, sporadically, etc.) collect this IDP/SSO data (e.g., with customer consent and the provisioning of credentials like an API token or an application installed into a SaaS environment) and standardize the data into a standardized format/model that can work across multiple (e.g., all) IDPs and SaaS applications for an entity to enable insight into all SaaS accounts belonging to a single user.

In some implementations, this standardized IDP/SSO data can be enriched with security context, analysis, and/or historical data. In some implementations, security context includes a description/categorization of the SaaS application, permissions the SaaS application requires, risks associated with the SaaS application, and/or the like. In some implementations, historical data can be used to give a broad overview and trends in usage of the SaaS application. Summaries and trends associated with the IDP/SSO data can be presented (e.g., displayed) in a platform using interactive data visualization tools such as graphs, tables, images, videos, and/or the like. Some implementations are related to a module built on top of the platform that allows security teams to measure and manage security risk by surfacing application-specific configuration insights, user behavior and activity across the entire SaaS ecosystem (and just not a subset of SaaS applications), and/or the like. By taking a more holistic approach to SaaS security, entities can reduce the likelihood of a security incident and repeatedly (e.g. continuously, periodically, sporadically) maintain adherence to regulatory compliance standards.

Some implementations are related to generating and providing a consolidated and comprehensive view of an entity's SaaS risk exposure. For example, instead of sifting through large amounts of raw data gathered from the user interface (UI)/APIs of various SaaS applications in use or via security information and event management (SIEMs), a consolidated and comprehensive view of an entity's entire SaaS risk exposure, along with measurable ways to mitigate the risk and increase cybersecurity, can be provided by a compute device.

Some implementations are related to discovering and scanning for users using particular SaaS applications, data exposed to or by SaaS applications, and permissions across all federated SaaS applications within seconds or minutes. Unlike software development kits (SDKs) and agents, which can be more complex to build and deploy, security operations users can collaborate with SaaS application teams to visualize issues and remediate risks in a timelier manner.

Some implementations are related to monitoring user activity across connected services. From a single interface, a user can view and understand how other users are behaving in different SaaS applications. These analytics can be used for robust threat detections that span an entity's entire SaaS estate. Techniques described herein can be applied for any number of users, user activities, and SaaS applications, which can include the collection, synthesis, and output of data that reaches scales far beyond what a human can practically perform.

Logins via identity providers like Okta® and Microsoft® can provide insight into approved SasS applications via SSO, but may only reveal a partial footprint of the SaaS applications used within an entity. In other words, some categories of SaaS services might not be protected or monitored under the aforementioned techniques and hence not discoverable if only IDP/SSO from a subset of SaaS applications used by an entity is analyzed, such as a SaaS application that lacks SSO support or the entity's license level of the SaaS application (e.g., SSO capabilities are packaged with different and/or higher license levels, and the entity's license level doesn't support SSO), employees of the entity using unsanctioned SaaS applications registered under the entity's name or using personal accounts into the SaaS applications, and/or the like; accordingly, in some implementations, browser extensions can be used to monitor users' activities at the SaaS applications. Said differently, browser extensions can monitor authentication attempts to various SaaS applications to give a more unified, comprehensive view of the SaaS ecosystem for each entity. As such, in some implementations, identity resolution is provided between local logins (e.g., logins without being relayed via an IDP and/or SSO) and logins via the IDP and/or SSO.

In some implementations, risk(s) associated with a SaaS application(s) used by an entity is evaluated (e.g., using a machine learning model, using hard coded rules, using a look up table, etc.) to generate a score(s) representing the risk(s) by evaluating criteria such as: (1) logins with authentication mechanisms mediated via IDP; (2) local (e.g., at the user's compute device) logins using MFA (e.g., and using a password manager); (3) local authentication without using MFA; and (4) local authentication without utilization of MFA using a shared password(s). By using techniques described herein, including using browser extension, visibility is provided for (1), (2), (3), and (4). Using a browser extension provides insights into authentication attempts into unfederated SaaS applications, also provides useful authentication attributes like usage of MFA, external SSO, password re-use, and/or the like; as such, a more accurate risk score can be generated (e.g., than if the browser extension is not used). Further, browser extensions give the ability to block any login attempts to these unfederated, non-sanctioned applications, providing entities a mechanism to control SaaS applications that can be used within the entity.

In some implementations, "cloud-based application" refers to a software program where cloud-based and local component work together (e.g., using remote servers for processing logic that is accessed through a web browser with an internet connection). Cloud-based applications can have, for example, a client-server architecture. In some implementations, an entity (e.g., business, employer, school, etc.) does not have a private cloud with cloud-based application that the entity entirely controls; said differently, in some implementations, the cloud-based applications described herein are not controlled by (e.g., owned by, managed by, in the name of, etc.) the entity.

FIG. 1 shows a system block diagram to generate analytics based on IDP/SSO data, according to an embodiment. FIG. 1 includes an analytics compute device 100, SaaS applications 120, user compute devices 140A, 140B, 140C, etc. (making up user compute device 140), SSO compute device 160, and IDP compute device 180, each communicably coupled to one another via a network 150. Each user compute device from user compute device 140 can be associated with (e.g., owned by, accessible by, in the name of, authorized to be used by, etc.) a user. For example, user compute device 140A is associated with user U1, user compute device 140B is associated with user U2, and user compute device 140C is associated with user U3.

The network 150 can be any suitable communications network for transferring data, operating over public and/or private networks. For example, the network 150 can include a private network, a Virtual Private Network (VPN), a Multiprotocol Label Switching (MPLS) circuit, the Internet, an intranet, a local area network (LAN), a wide area network (WAN), a metropolitan area network (MAN), a worldwide interoperability for microwave access network (WiMAX®), an optical fiber (or fiber optic)-based network, a Bluetooth® network, a virtual network, and/or any combination thereof. In some instances, the network 150 can be a wireless network such as, for example, a Wi-Fi® or wireless local area network ("WLAN"), a wireless wide area network ("WWAN"), and/or a cellular network. In other instances, the network 150 can be a wired network such as, for example, an Ethernet network, a digital subscription line ("DSL") network, a broadband network, and/or a fiber-optic network. In some instances, the network 150 can use Application Programming Interfaces (APIs) and/or data interchange formats (e.g., Representational State Transfer (REST), JavaScript Object Notation (JSON), Extensible Markup Language (XML), Simple Object Access Protocol (SOAP), and/or Java Message Service (JMS)). The communications sent via the network 150 can be encrypted or unencrypted. In some instances, the network 150 can include multiple networks or subnetworks operatively coupled to one another by, for example, network bridges, routers, switches, gateways and/or the like.

Analytics compute device 100, the SaaS compute devices hosting SaaS applications 120, user compute devices 140, SSO compute device 160, and IDP compute device 180 can be any type of compute device (e.g., desktop, laptop, phone, tablet, smart-device, internet-of-things device, and/or the like) and can each include a processor operatively coupled to a memory (e.g., via a system bus). The processors (e.g., processor 102) can be, for example, a hardware-based integrated circuit (IC) or any other suitable processing device configured to run and/or execute a set of instructions or code. For example, the processors can be a general-purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC) and/or the like. In some implementations, the processors can be configured to run any of the methods and/or portions of methods discussed herein.

The memories (e.g., memory 104) can be, for example, a random-access memory (RAM), a memory buffer, a hard drive, a read-only memory (ROM), an erasable programmable read-only memory (EPROM), and/or the like. The memories can be configured to store any data used by their respective processors to perform the techniques discussed herein. In some instances, the memories can store, for example, one or more software programs and/or code that can include instructions to cause the processors to perform one or more processes, functions, and/or the like. In some implementations, the memories can include extendible storage units that can be added and used incrementally. In some implementations, the memories can be portable memories (for example, a flash drive, a portable hard disk, and/or the like) that can be operatively coupled to the processors. In some instances, the memories 104 can be remotely operatively coupled with a compute device (not shown in FIG. 1).

In some implementations, users U1-U3 can access SaaS applications 120 via user compute devices 140 and network 150. For example, user compute device 140A can access a SaaS chat application from SaaS applications 120, user compute device 140B can access a SaaS email application from SaaS applications 120, and user compute device 140C can access a SaaS database application from SaaS applications 120. Before user compute devices 140 can access SaaS applications 120, however, user compute devices 140, SaaS applications 120, IDP compute device 180, and SSO compute device 160 can communicate to verify that users U1, U2, and U3 are authorized to access SaaS applications 120.

In some implementations, the communications between user compute devices 140, SaaS applications 120, IDP compute device 180, and SSO compute device 160 to verify that users U1, U2, and U3 are authorized to access SaaS applications 120 includes users U1, U2, and U3 using user compute devices 140A, 140B, and 140C, respectively, to request access to use SaaS applications 120. In response, the SaaS compute device(s) hosting SaaS applications 120 requests SSO compute device 160 to verify the identity of users U1, U2, and U3, and determines that users U1, U2, U3 have either (1) not yet signed in or (2) already signed in. For any users U1, U2, and/or U3 that have not yet signed in, user compute devices 140 then redirects to a SSO login page for that user to at the SSO login page. For any users U1, U2, and/or U3 that have already signed in, user compute device 140 bypasses the SSO login page without requiring those users to sign in at the SSO login page. Optionally, users U1, U2, and U3 are instructed (e.g., by SSO compute device 160, user compute devices 140, IDP compute device 180, SaaS applications 120, and/or the like) to perform a MFA test. After users U1, U2, and U3 login at the SSO page (and optionally complete the MFA test), SSO compute device 160 sends a SAML request to IDP compute device 180, and IDP compute device 180 sends a SAML response to SSO compute device 160 confirming the users' U1, U2, U3 identity. Thereafter, SSO compute device 160 sends a SAML assertion to the SaaS compute device(s) hosting SaaS applications 120, and user compute devices 140 are redirected back to the SaaS applications for usage by users U1, U2, and U3.

Variations to aforementioned communication to verify that users U1, U2, and U3 are authorized to access SaaS applications 120 can exist. For example, in some implementations, SSO compute device 160 is used to verify that users U1, U2, and/or U3 are authorized SaaS applications 120 without using IDP compute device 180. As another example, in some implementations, IDP compute device 180 is used to verify that users U1, U2, and/or U3 are authorized SaaS applications 120 without using SSO compute device 160. As another example, in some implementations, verifying that users U1, U2, and/or U3 are authorized SaaS applications 120 can be an IDP-initiated SSO (e.g., initiated at IDP compute device 180). As another example, in some implementations, verifying that users U1, U2, and/or U3 are authorized SaaS applications 120 can be a SP-initiated SSO (e.g., initiated at a SaaS application from SaaS applications 120 that the login request is for).

At least a portion of the communications between user compute devices 140, SaaS applications 120, IDP compute device 180, and/or SSO compute device 160 to verify that users U1, U2, and U3 are authorized to access SaaS applications 120 can be sent to and/or received by analytics compute device 100 and stored in memory 104 as IDP/SSO raw data 106. In some implementations, analytics compute device 100 pulls IDP/SSO raw data 106 from SSO compute device 160 and/or IDP compute device 180 (e.g., via an API and after the entity has provided permission for analytics compute device 100 to pull the IDP/SSO raw data 106). In some implementations, SSO compute device 160 and/or IDP compute device 180 pushes IDP/SSO raw data 106 to analytics compute device 100 (e.g., via an API and after the entity has provided permission for analytics compute device 100 to pull the IDP/SSO raw data 106).

The IDP/SSO raw data 106 can then be used to generate IDP/SSO data 108. Generating IDP/SSO data 108 from IDP/SSO raw data 106 can include transforming IDP/SSO raw data 106 into a standard format. Further, the IDP/SSO raw data 106 can be modified to include security information (e.g., description of a SaaS application, categorization of a SaaS application, permissions a SaaS application use or requires, risks associated with a SaaS application, etc.) analysis information, and/or historical information (e.g., trends associated with usage of a SaaS application, overview of usage of a SaaS application, etc.) to generate IDP/SSO data 108. IDP/SSO data 108 can include representations of various information, including but not limited to: the list of SaaS applications connected to IDP compute device 180 (i.e., SaaS applications 120); what and when users are trying to access a SaaS application from SaaS applications 120; what and when users received permission to access a SaaS application from SaaS applications 120; what and when users are using MFA to access a SaaS application from SaaS applications 120; attributes (e.g., IP address, country, username, and/or the like) associated with users' compute devices when trying to access a SaaS application from SaaS applications 120; and/or the like.

In some situations, although IDP/SSO raw data 106 can provide some insights regarding an entity's cybersecurity posture, IDP/SSO raw data 106 may not include data regarding, for example, a user (e.g., user U1) using its user compute device (e.g., user compute deice 140A) to access a SaaS application from SaaS applications 120 using a different non-entity account (e.g., a personal account instead of a work), a SaaS application from SaaS applications 120 that does not use SSO and/or IDPs, a SaaS application from SaaS applications 120 for which the entity does not have access to SSO and/or IDP services (e.g., the entity's license/subscription plan to the SaaS application doesn't provide the option to login using SSO and/or IDP), and/or the like. As such, memory 104 can further include (e.g., store) browser extension data 112. Browser extension data 112 can be received from user compute device 140 and include representations of various data such as the SaaS application from SaaS applications 120 that a user compute device(s) accessed (or is trying to access), what and when the user compute device(s) accessed or tried to access the SaaS application, what and when user compute device(s) received permission to access the SaaS application, what and when the user compute device(s) is using MFA to access the SaaS application, attributes (e.g., IP address, country, username, and/or the like) associated with the user compute device(s) when trying to access the SaaS application, the list of SaaS applications not connected to IDP compute device 180, what users are accessing a SaaS application using a non-entity account (e.g., a personal account), SaaS applications that are being accessed but should not be accessed (e.g., predetermined as a SaaS application that should not be accessed), and/or the like. Unlike IDP/SSO raw data 106, however, browser extension data 112 was not collected by analytics compute device 100 receiving communications between user compute devices 140, SaaS applications 120, IDP compute device 180, and/or SSO compute device 160 to verify that users U1, U2, and U3 are authorized to access SaaS applications 120. Instead, each user compute device from user compute devices 140 can include (e.g., stored in memory of that user compute device) a representation of a browser extension that can be used to capture data about that user compute device. For example, user compute device 140A includes a representation of a browser extension that can capture data about user compute device 140A, user compute device 140B includes a representation of a browser extension that can capture data about user compute device 140B, user compute device 140C includes a representation of a browser extension that can capture data about user compute device 140C, and so on. Each time a user compute device logs into and/or tries to log into a SaaS application from SaaS applications 120, the browser extension can log data associated with the login and/or login attempt. For example, once user compute device 140A navigates to the login page for a SaaS application from SaaS applications 120, the browser extension can begin logging data until a predefined stopping criteria has been met (e.g., the user compute device logs out of the SaaS application, a time limit is met, etc.) and send the logged data—the browser extension data—to analytics compute device 100 to be part of browser extension data 112 (e.g., in real time, at the end of a user and/or upon the user logging out of the SaaS application or their user account, in a batch according to a predetermined schedule (e.g., once a day, once per week, etc.), and/or the like). In some implementations, the browser extension for a user's compute device begins logging data as soon as the browser extension is installed at the user's compute device. Thus, in some implementations, the browser extension can begin logging data prior to a login and/or login attempt. In some implementations, the browser extension doesn't explicitly access the SaaS application; rather, for example, the browser extension can derive insights by observing activity on the browser without explicitly accessing the SaaS application.

Similar to IDP/SSO raw data 106 being used to generate IDP/SSO data 108 by transforming IDP/SSO raw data 106 into a standard format, browser extension data 112 can be transformed into a standard format. Further, browser extension data 112 can be modified to include security information (e.g., description of a SaaS application, categorization of a SaaS application, permissions a SaaS application use or requires, risks associated with a SaaS application, etc.) analysis information, and/or historical information (e.g., trends associated with usage of a SaaS application, overview of usage of a SaaS application, etc.).

IDP/SSO data 108 and/or browser extension data 112 can then be used to determine analytics 110. Said similarly, analytics 110 can represent information associated with (e.g., represented by, determined based on, etc.) IDP/SSO data 108 and/or browser extension data 112. In some implementations, a machine learning model can be used to generate analytics 110 based on IDP/SSO data 108 and/or browser extension data 112. In some implementations, the machine learning model may have been trained using various IDP/SSO data input learning data and various analytics generated based on the input learning data as target learning data. For each SaaS application from SaaS applications 120, analytics 110 can include indications of, for example, users that are actively using that SaaS application, users that are not actively using that SaaS application, failed login attempts to that SaaS application, users that have MFA enabled to access that SaaS application, users on that can access that SaaS application without using MFA authentication, and/or the like. In some implementations, analytics 110 can also include indication of each SaaS application from SaaS applications 120 to which each user (e.g., users U1, U2, U3, etc.) has access. In some implementations, analytics 110 includes indication of trends associated with activities performed by user at SaaS applications 120. In some implementations, analytics 110 includes indication of SaaS applications that are being accessed and/or are being attempted to be accessed using a non-entity account (e.g., a personal account). In some implementations, analytics 110 includes indication of unauthorized SaaS applications that are being accessed and/or are being attempted to be accessed.

In some implementations, an action can be caused based on analytics 110. For example, a representation of at least a portion of analytics 110 can be caused to be displayed at a compute device, such as a compute device from user compute devices 140, analytics compute device 100, IDP compute device 180, SSO compute device 160, a SaaS compute device hosting a SaaS application from SaaS applications 120, a compute device not shown in FIG. 1 (e.g., a compute device of a cybersecurity analyst), and/or the like. Additional details related to displaying analytics 110 are discussed with respect to FIGS. 3A, 3B, and 3C.

As another example of an action, if analytics 110 indicates that certain best practices (e.g., as defined by the entity, as defined by a third party, etc.) are not being followed, an alert indicating that best practice not being followed can be generated at any compute device, and in some implementations, actions that can be taken to better follow that best practice; in some implementations, this can be receiving an indication of rules for each SaaS application, and comparing the analytics to the rules to determine how the analytical values can better follow their respective rules if that rule is being broken. As another example of an action, if analytics 110 indicates a certain risk(s), an action(s) can be taken to mitigate that risk(s). For example, if a number of active users is greater than a predetermined threshold, at least some users (e.g., all active users, just those users over the predetermined threshold, etc.) can be prevented from logging on and/or logged out. As another example, if a number of users greater a predetermined threshold logs in from a location(s) that is untrustworthy or using an internet service provider(s) that is untrustworthy, those users can be prevented from logging on and/or automatically logged out; additional details related to determining trustworthiness based on location and internet service provider are discussed at U.S. patent application Ser. No. 18/113,983 titled "PROVIDING INFORMATION SECURITY TO AN ENTITY BY DETECTING IMPOSSIBLE TRAVEL EVENTS ACROSS MULTIPLE CLOUD-BASED APPLICATION SERVICES" and filed Feb. 24, 2023, the contents of which are incorporated by reference in its entirety herein.

As another example of an action, a user (e.g., the user's account, the user's compute device) can be blocked, removed, kicked off, and/or otherwise prevented from accessing a SaaS application if the user accessed (or is trying to access) the SaaS application using a non-entity account and/or the SaaS application is an unauthorized SaaS application (e.g., marked as unauthorized by the entity). As another example of an action, if the user accessed (or is trying to access) a SaaS application that is an unauthorized SaaS application (e.g., marked as unauthorized by the entity), the user's actions at the unauthorized SaaS application can be tracked (e.g., rather than immediately stopping the user from acting at the unauthorized SaaS application). As another example of an action, a message can be sent (e.g., by analytics compute device 100) to a compute device of the IT department, a security officer, the CEO, law enforcement agency, and/or any other person who can perform a risk mitigating action if the user accessed (or is trying to access) the SaaS application using a non-entity account and/or the SaaS application is an unauthorized SaaS application (e.g., marked as unauthorized by the entity. As another example of an action, a user's computer (e.g., the user's account, the user's compute device) can be frozen if the user accessed (or is trying to access) the SaaS application using a non-entity account and/or the SaaS application is an unauthorized SaaS application (e.g., marked as unauthorized by the entity In some implementations, after analytics 110 has been generated based on IDP/SSO raw data 106 and IDP/SSO data 108, the analytics compute device 100 can perform the same process using new IDP/SSO raw data. Therefore, analytics compute device 100 can repeatedly (e.g., continuously, periodically, sporadically, etc.) generate analytics that represent the latest information associated with an entity's SaaS posture.

Although not show in in FIG. 1, in some implementations, one or more endpoint agents can be used. For example, user compute devices 140 and/or analytics compute device 100 can receive, via APIs and/or though interaction outside of the browser, logs from endpoint agents (e.g., Crowdstrike®); these logs can be combined other data, such as IDP/SSO data 108 and/or browser extension data 112, to generate analytics 110. The logs can include data such as page load performance data from users' browsers with monitoring of wireless and wired networks, gateways, proxies, VPNs, WAN and the Internet, and/or the like, and the analytics 110 can include analytics determined based on the logs, such as which users are using a VPN, users' internet service providers, and/or the like. In some implementations, the logs that are captured are actual login related events, such as user information, context, application the user logged into and the mechanism of login (e.g., SSO login, local username/password login, MFA, etc.), and/or the like. In some implementations, an endpoint agent refers to a compute device that can be connected to a network.

Although FIG. 1 shows and was discussed with respect to a certain number of compute devices, it can be appreciated that any number of compute devices can be used to perform the implementations discussed herein. For example, in some implementations, the functions of the SSO compute device 160 and IDP compute device 180 are performed by a single compute device. As another example, IDP/SSO data 108 can be generated using IDP/SSO raw data 106 by one compute device, and a second compute device can generate analytics 110 using IDP/SSO data 108.

Figure 2:
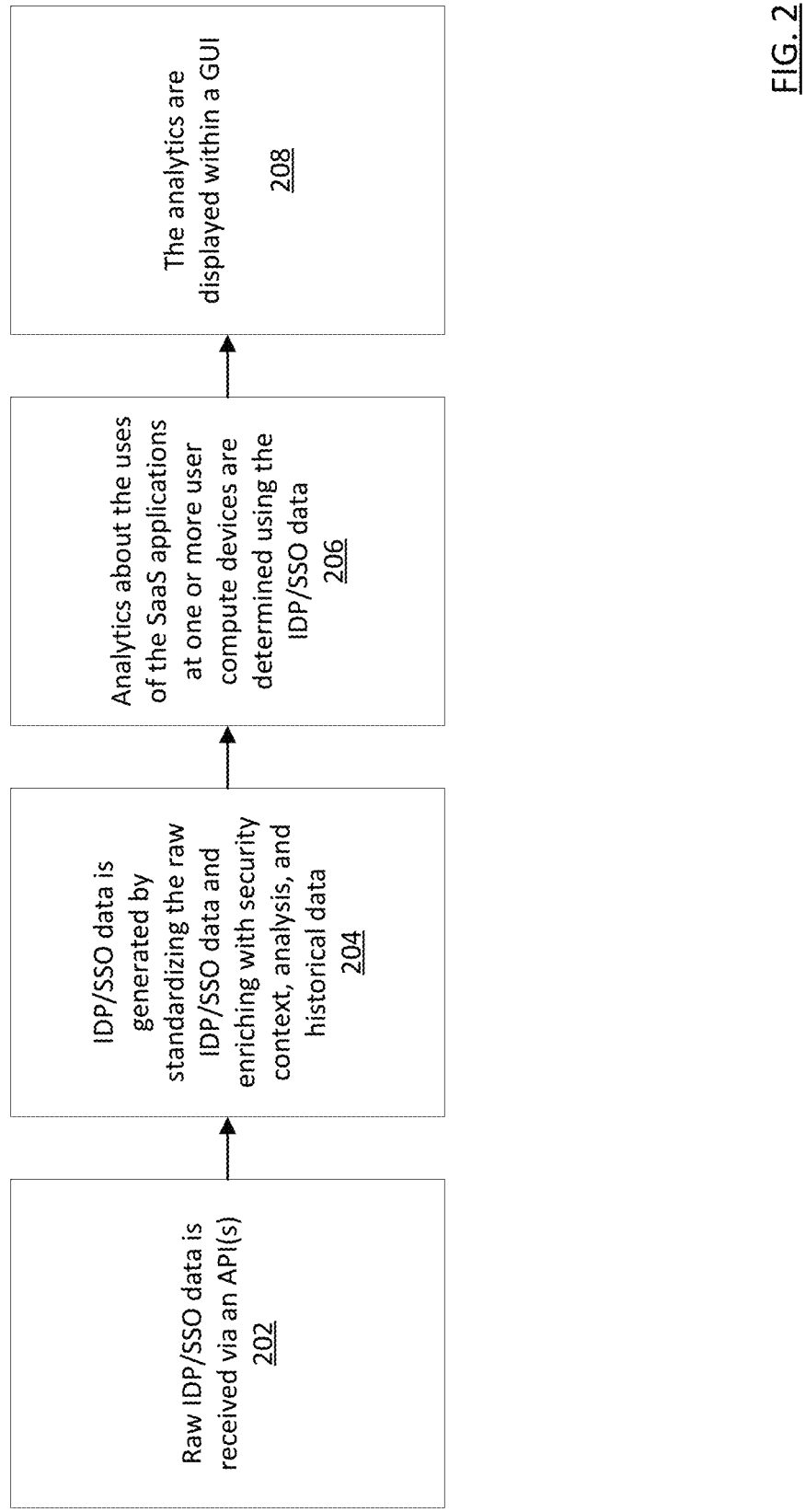
FIG. 2 shows a flowchart of a method to determine and generate analytics using IDP/SSO data, according to an embodiment.

FIG. 2 shows a flowchart of a method to determine and generate analytics using IDP/SSO data, according to an embodiment. At 202, raw IDP/SSO data (e.g., IDP/SSO raw data 106) is received via an API(s). For example, analytics compute device 100 can receive IDP/SSO raw data 106 from communications between SSO compute device 160 and IDP compute device 180 (e.g., without receiving communications from SaaS applications 120 and/or user compute devices 140). At 204, IDP/SSO data (e.g., IDP/SSO data 108) is generated by standardizing the raw IDP/SSO data and enriching the standardized raw IDP/SSO data with security context, analysis, and historical data. In some implementations, analytics compute device 100 can perform step 204.

At 206, analytics (e.g., analytics 110) about the uses (e.g., login process) of the SaaS application by one or more user compute devices are determined using the IDP/SSO data. In some implementations, analytics compute device 100 can perform step 206. Although not explicitly shown in FIG. 2, in some implementations, analytics about the users of the SaaS application can also be determined using browser extension data (e.g., browser extension data 112).

At 208, the analytics are displayed within a graphical user interface (GUI). For example, the analytics can be displayed at a display(s) of a user compute device (e.g., user compute device 140A). In some implementations, 208 includes analytics compute device 100 sending an electronic signal representing analytics 110 to a user compute device (e.g., user compute device 140A), where the user compute device is configured to display the analytics in response to receiving the electronic signal. In some implementations, step 202 to 208 can be performed in real time (e.g., at machine speed, allowing for network latency, etc.) and automatically (e.g., without human intervention).

Figure 3A:
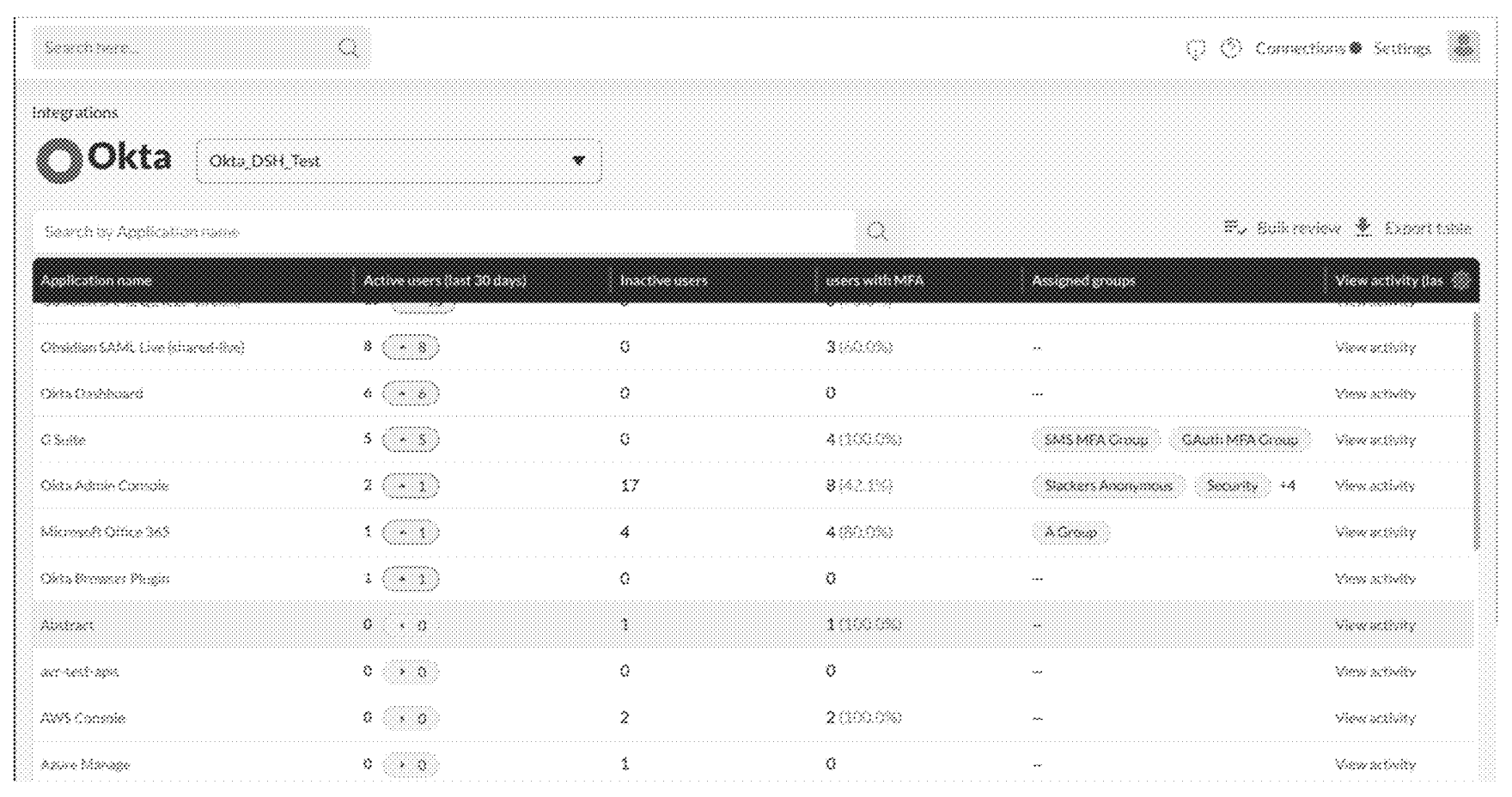
Figure 3B:
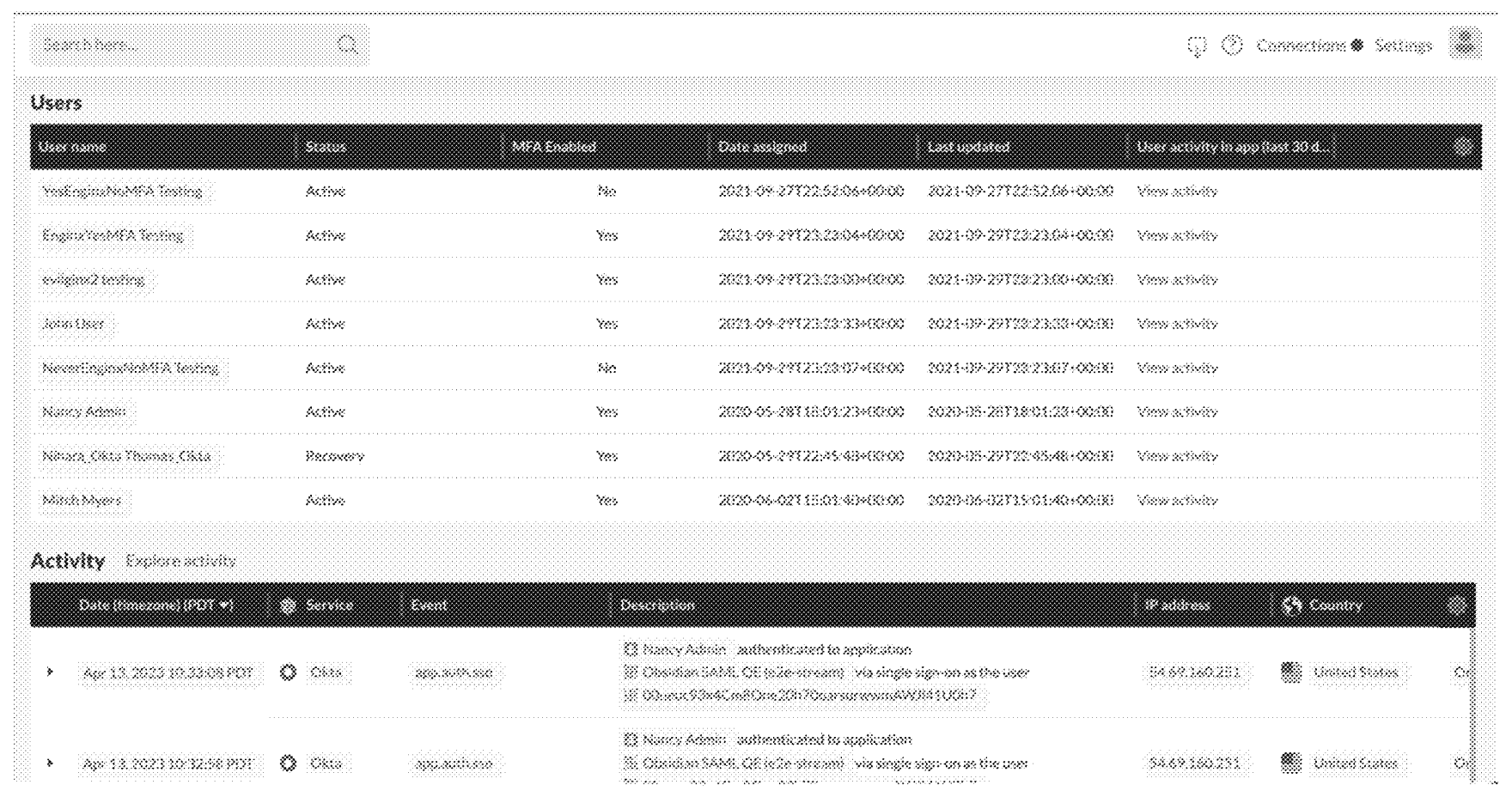

FIGS. 3A-3B show example screenshots of analytics being displayed via a GUI, according to an embodiment. Data that is to be analyzed (e.g., IDP/SSO raw data 106 and IDP/SSO data 108) can be associated with a massive amount of data, such as thousands of login attempts to thousands of SaaS applications by thousands of entities every day. As will be shown and discussed with respect to FIGS. 3A-3C, one or more implementations recite improvements over known systems, resulting in an improved user interface for compute devices. For example, some implementations are related to presenting a limited amount of information (e.g., summarized information, only certain information) determined based on the set of data to be analyzed. Some implementations are related to determining and/or causing display of the limited set of information (e.g., user names, IP addresses, number of active users, etc.). Such limited set of information can be advantageous in some cases. For example, a user (e.g., cybersecurity analyst) may not be able to view the entire set of data to be analyzed using a compute device with a smaller screen, lesser processing power, lesser memory, and/or the like, but may be able to view the limited set of information (or an aggregation of a set of information) using that compute device. As such, a user's and the compute device's efficiency can be improved (e.g., in analyzing the set of data to be analyzed).

FIG. 3A includes: a first column, labelled "Application name," that indicates various SaaS applications associated with (e.g., used by) an entity, such as G Suite® and Microsoft Office 365®; a second column, labelled "Active users (last 30 days)," that indicates the number of users from the entity that have logged into the SaaS application over the last 30 days, as well as how much that number has changed from the previous 30 days; a third column, labelled "Inactive users," that indicates the number of users from the entity that have permission to log into the SaaS application but are not currently logged in; a fourth column, labelled "users with MFA," that indicates the number of users who have MFA setup to login to the SaaS application; a fifth column, labelled "Assigned groups," that indicates any groups that the SaaS application is associated with (e.g., included as part of); and a sixth column, labelled "View activity (last 30 days)," that includes a link that displays additional details related to activity (e.g., when users logged in, what users logged in, the IP address that was used, country the login took place from, etc.) at that SaaS application.

FIG. 3B includes a first table labelled "Users" and a second table labelled "Activity." The first table, labelled "Users," indicates, for each SaaS application: user names of users that have permission to access that SaaS application (under column labelled "User name"; the status for each user name within that SaaS application (under column labelled "Status"); if the user name is MFA enabled to access that SaaS application (under column labelled "MFA Enabled"), when the user name was given permission to login to that SaaS application (under column labelled "Date assigned"), the last time the user name was used to login to that SaaS application (under column labelled "Last updated"), and activity performed under that user name in that SaaS application and in the last 30 days (under column labelled "User activity in app (last 30 d . . . ").

The second table in FIG. 3B, labelled "Activity," indicates activities performed at a SaaS application and is an example of what can be displayed if "View activity" is selected under the "View activity (last 30 days) column" from FIG. 3A. As shown in the second table in FIG. 3B, each activity event indicates a date and time that a login occurred (under column labelled "Date (timezone) PDT)"), the SaaS application to which the login was (under column labelled "Service"), the activities that are logged by the IDP and/or SSO entity during login (under column labelled "Event"), a description of the login event, such as the username, if SSO was used, a public or private key associated with the username, etc. (under column labelled "Description"), the IP address used to login (under column labelled "IP address"), and the country where the login occurred (under column labelled "Country").

Figure 3C:
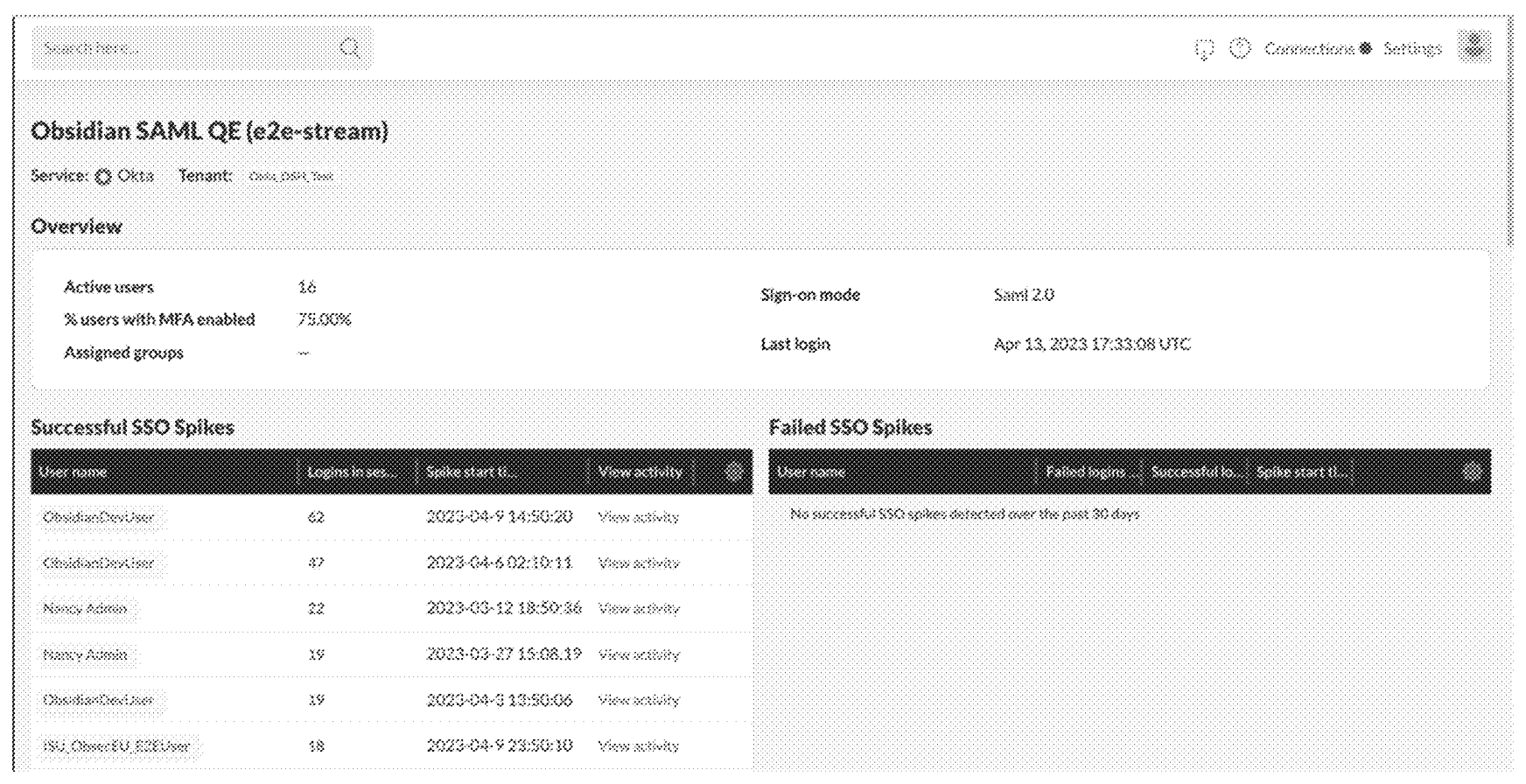

FIG. 3C includes various information associated with IDP/SSO data (e.g., IDP/SSO data 108). In the example shown in FIG. 3C, the service is Okta and the tenant is Okta_DSH_Test. As seen at the table labelled "Overview," there are 16 active users accessing SaaS applications using Okta (as an IDP and/or SSO), 75% of the users that have permission to use the Okta (IDP and/or SSO) have MFA enabled, the sign-on mode is Sami 2.0, and the last login to a SaaS application via Okta (IDP and/or SSO) by a user of the entity was Apr. 13, 2023 at 17:33.08 UTC. The table labelled "Successful SSO Spikes" indicates users that have successfully logged in via SSO (under column labelled "User name"), the number of times the user has successfully logged in via SSO (under column labelled "Logins in session"), the last time the user logged in via SSO (under column labelled "Spike start time"), and a link to see more activity related to the user's logins via SSO (under column labelled "View activity"). The table labelled "Failed SSO Spikes" indicates users (if any, though there are none in this example) that have failed when attempting to login in via SSO (under column labelled "User name"), the number of times the user has failed to login via SSO (under column labelled "Logins in session"), and the last time the user tried but failed to login via SSO (under column labelled "Spike start time").

FIG. 4 shows a flowchart of a method 400 to generate analytics based on IDP/SSO data, according to an embodiment. In some implementations, method 400 can be performed by a processor (e.g., processor 102).

At 402, IDP/SSO data (e.g., IDP/SSO data) that is associated with an IDP (e.g., IDP compute device 180) and an SSO entity (e.g., SSO compute device 160) is received (e.g., from SSO compute device 160 and from IDP compute device 180, but not from SaaS applications 120 or user compute devices 140). The IDP and the SSO entity manage access to a plurality of cloud-based applications (e.g., SaaS applications 120) for a plurality of user compute devices (e.g., user compute devices 140) for a plurality of users (e.g., users U1, U2, U3).

At 404, analytics (e.g., analytics 110) are generated based on the IDP/SSO data. The analytics can be generated without accessing the plurality of cloud-based applications. In some implementations, 404 occurs automatically (e.g., without human interaction) in response to completing 402.

At 406, an action is caused based on the analytics. Examples of actions include displaying the analytics, generating an alert if an analytical value is outside a predetermined acceptable range, causing user accounts to be logged out, and/or the like. In some implementations, 406 occurs automatically (e.g., without human interaction) in response to completing 404.

In some implementations of method 400, the IDP/SSO data includes indications of, for each cloud-based application from the plurality of cloud-based applications, users from the plurality of users using that cloud-based application.

In some implementations of method 400, the plurality of users are included in a plurality of groups and the IDP/SSO data includes indications of, for each cloud-based application from the plurality of cloud-based applications, users from the plurality of users that have permission to access that cloud-based application and groups from the plurality of groups that have permission to access that cloud-based application.

In some implementations of method 400, the IDP/SSO data includes indications of attributes (e.g., date, time, service, event, description, IP address, country, etc.) associated with login attempts to the plurality of cloud-based applications by the plurality of users via the plurality of user compute devices.

In some implementations of method 400, the plurality of users are members of a common entity (e.g., the entity employs the plurality of users), and each cloud-based application from the plurality of cloud-based applications is used by the entity.

In some implementations of method 400, the analytics includes indications of, for each cloud-based application from the plurality of cloud-based applications: users from the plurality of users that are actively using that cloud-based application, and users from the plurality of users that are not actively using that cloud-based application.

In some implementations of method 400, the analytics includes indications of, for each cloud-based application from the plurality of cloud-based applications, failed login attempts to that cloud-based application by users from the plurality of users.

In some implementations of method 400, the analytics includes indications of, for each cloud-based application from the plurality of cloud-based applications, users from the plurality of users using that cloud-based application that have multi-factor authentication (e.g., biometric, code from a text message, answering a phone call, verifying a link from email, etc.) enabled to access that cloud-based application.

In some implementations of method 400, the analytics includes indications of, for each cloud-based application from the plurality of cloud-based applications, users from the plurality of users using that cloud-based application that can access that cloud-based application without using multi-factor authentication.

In some implementations of method 400, the analytics includes indications of, for each user from the plurality of users, cloud-based applications from the plurality of cloud-based applications that user has access to.

In some implementations of method 400, the analytics includes indication of trends associated with activities performed by the plurality of users at the plurality of cloud-based applications (e.g., which SaaS applications are being used more, which SaaS applications are being used less, which users are using which SaaS applications, when are users using certain SaaS application, where are users logging in from, what proportion of SSO sign ins are successful, etc.).

Some implementations of method 400 further include receiving raw IDP/SSO data (e.g., IDP/SSO raw data 106) that is associated with the plurality of user compute devices for the plurality of users using the plurality of cloud-based applications. Some implementations further include standardizing the raw IDP/SSO data to generate standardized IDP/SSO data. Some implementations further include modifying the standardized IDP/SSO data using at least one of security information, analysis information, or historical information to generate the IDP/SSO data.

Some implementations of method 400 further include determining a remedial action to improve a cybersecurity associated with the plurality of users and the plurality of user compute devices, based on the analytics. Some implementations further include causing (e.g., without human intervention) an indication of the remedial action to be displayed.

Some implementations of method 400 further include receiving, from the plurality of user compute devices, browser extension data (e.g., browser extension data 112). The browser extension data can be captured via a plurality of browser extensions at the plurality of user compute devices. The analytics can be further generated based on the browser extension data.

Some implementations of method 400 further include receiving, from an endpoint agent, at least one log. For example, the processor can receive an electronic signal (e.g., from the endpoint agent) representing the log. The analytics are further generated based on the log.

FIG. 5 shows a flowchart of a method 500 to generate different analytics based on different IDP/SSO data for different groups of users, according to an embodiment. In some implementations, method 500 can be performed by a processor (e.g., processor 102).

At 502, first IDP/SSO data (e.g., IDP/SSO data 108) that is associated with a first IDP (e.g., IDP compute device 180) and a first SSO entity (e.g., SSO compute device 160) is received. The first IDP and the first SSO entity are configured to manage access to a first plurality of cloud-based applications (e.g., SaaS applications 120) for a first plurality of user compute devices (e.g., user compute devices 140) for a first plurality of users (e.g., users U1, U2, U3). At 504, generate a first set of analytics (e.g., analytics 110) are generated based on the first IDP/SSO data. At 506, a first action is caused based on the first set of the analytics. At 508, second IDP/SSO data (e.g., not shown in FIG. 1) that is (1) different than the first IDP/SSO data and (2) associated with a second IDP (e.g. not shown in FIG. 1) and a second SSO entity (e.g., not shown in FIG. 1) is received. The second IDP and the second SSO entity manage access to a second plurality of cloud-based applications (e.g., not shown in FIG. 1) for a second plurality of user compute devices (e.g., not shown in FIG. 1) for a second plurality of users (e.g., not shown in FIG. 1). The second plurality of cloud-based applications are different than the first plurality of cloud-based applications. The second plurality of user compute devices are different than the first plurality of user compute devices. The second plurality of users are different than the first plurality of users. For example, the first plurality of users may be part of a first entity and the second plurality of users may be part of a second entity. At 510, a second set of analytics (e.g., not shown in FIG. 1) are generated based on the second IDP/SSO data. At 512, a second action is caused based on the second set of analytics. In some implementations, the process at 502 to 512 can be performed in real time (e.g., at machine speed, allowing for network latency, etc.) and automatically (e.g., without human intervention).

Some implementations of method 500 further include receiving third IDP/SSO data that is (1) different than the first IDP/SSO data and the second IDP/SSO data and (2) associated with a third IDP and a third SSO entity. The third IDP and the third SSO entity are configured to manage access to a third plurality of cloud-based applications for a third plurality of user compute devices for a third plurality of users. The third plurality of cloud-based applications is different than the first plurality of cloud-based applications and the second plurality of cloud-based applications. The third plurality of user compute devices is different than the first plurality of user compute devices and the second plurality of compute devices. The third plurality of users is different than the first plurality of users and the third plurality of users. Some implementations of method 500 further include generating a third set of analytics based on the third IDP/SSO data. Some implementations of method 500 further include causing a third action based on the third set of analytics.

Figure 6:
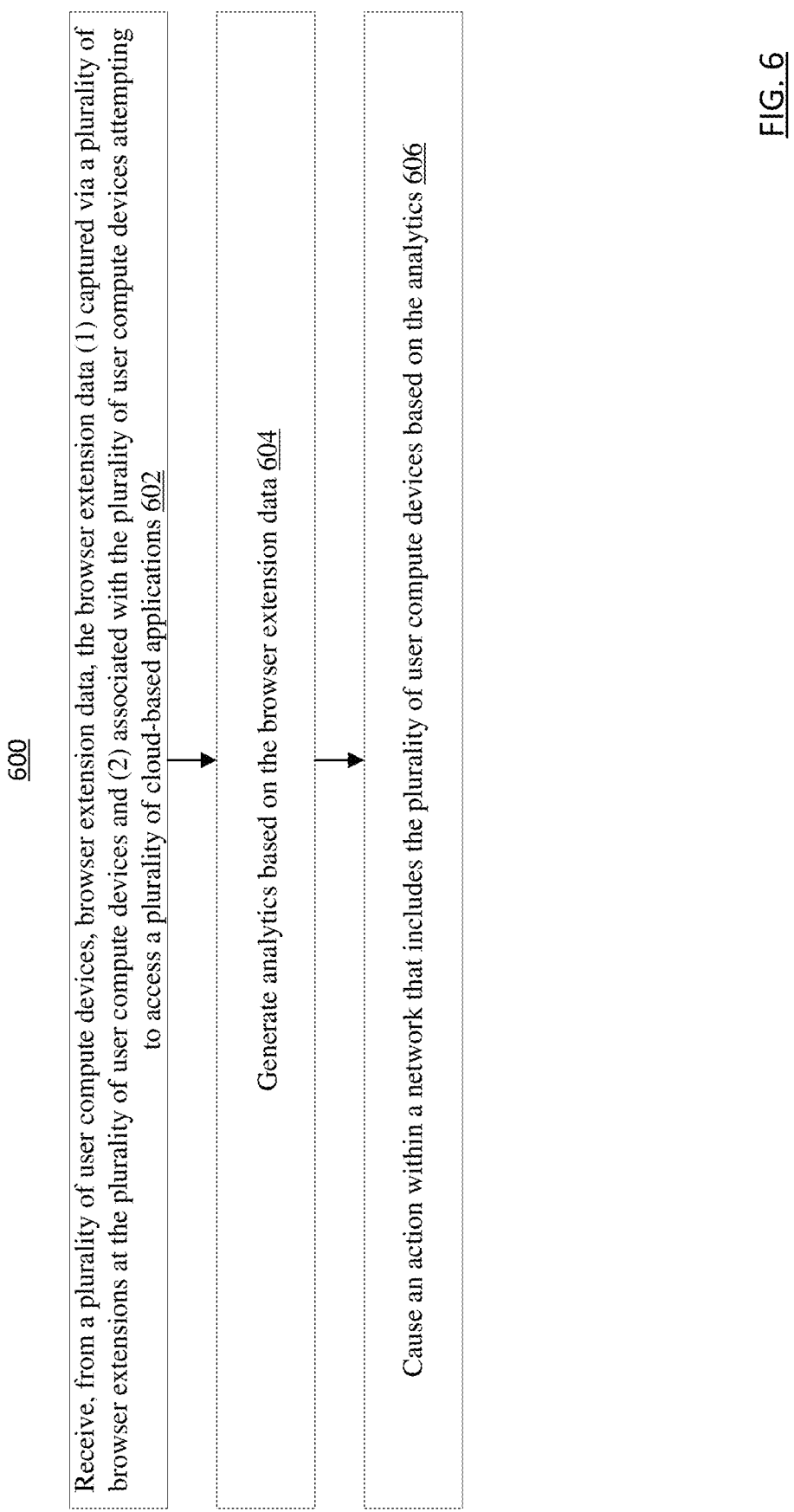
FIG. 6 shows a flowchart of a method to generate different analytics based on browser extension data, according to an embodiment.

FIG. 6 shows a flowchart of a method 600 to generate different analytics based on browser extension data, according to an embodiment. In some implementations, method 600 can be performed by a processor (e.g., processor 102).

At 602, browser extension data (e.g., browser extension data 112) is received from a plurality of user compute devices (e.g., user compute devices 140). The browser extension data is (1) captured via a plurality of browser extensions at the plurality of user compute devices and (2) associated with the plurality of user compute devices attempting to access a plurality of cloud-based applications. At 604, analytics (e.g., analytics 110) are generated based on the browser extension data. At 606, an action is caused within a network that includes the plurality of user compute devices based on the analytics. Causing an action within a network that includes the plurality of user compute devices could include, for example, sending an electronic signal including a representation of the action to a device (e.g., analytics compute device 100, SaaS applications 120, SSO compute device 160, IDP compute device 180, a compute device from user compute device 140, and/or the like), where the device is configured to perform the action in response to (e.g., automatically and without human intervention) receiving the electronic signal.

In some implementations of method 600, the analytics indicate that a user compute device from the plurality of compute devices is attempting to access a cloud-based application from the plurality of cloud-based application flagged as unauthorized, and the action includes preventing the user compute device from accessing the cloud-based application (e.g., by sending an electronic signal to the user compute device and/or cloud-based application including instructions to prevent the user compute device from accessing the cloud-based application).

In some implementations of method 600, the analytics indicate that a user compute device from the plurality of compute devices is attempting to access a cloud-based application from the plurality of cloud-based application using an account predetermined as unacceptable to access the cloud-based application (e.g., a personal account rather than a work account, a school account rather than a personal account, a blacklisted account, and/or the like), and the action includes preventing the user compute device from accessing the cloud-based application.

All combinations of the foregoing concepts and additional concepts discussed here (provided such concepts are not mutually inconsistent) are contemplated as being part of the subject matter disclosed herein. The terminology explicitly employed herein that also may appear in any disclosure incorporated by reference should be accorded a meaning most consistent with the particular concepts disclosed herein.

The skilled artisan will understand that the drawings primarily are for illustrative purposes, and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

To address various issues and advance the art, the entirety of this application (including the Cover Page, Title, Headings, Background, Summary, Brief Description of the Drawings, Detailed Description, Embodiments, Abstract, Figures, Appendices, and otherwise) shows, by way of illustration, various embodiments in which the embodiments may be practiced. The advantages and features of the application are of a representative sample of embodiments only, and are not exhaustive and/or exclusive. Rather, they are presented to assist in understanding and teach the embodiments, and are not representative of all embodiments. As such, certain aspects of the disclosure have not been discussed herein. That alternate embodiments may not have been presented for a specific portion of the innovations or that further undescribed alternate embodiments may be available for a portion is not to be considered to exclude such alternate embodiments from the scope of the disclosure. It will be appreciated that many of those undescribed embodiments incorporate the same principles of the innovations and others are equivalent. Thus, it is to be understood that other embodiments may be utilized and functional, logical, operational, structural and/or topological modifications may be made without departing from the scope and/or spirit of the disclosure. As such, all examples and/or embodiments are deemed to be non-limiting throughout this disclosure.

Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the Figures and/or throughout are not limited to a fixed operating order and/or arrangement, but rather, any disclosed order is exemplary and all equivalents, regardless of order, are contemplated by the disclosure.

Various concepts may be embodied as one or more methods, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

In addition, the disclosure may include other innovations not presently described. Applicant reserves all rights in such innovations, including the right to embodiment such innovations, file additional applications, continuations, continuations-in-part, divisionals, and/or the like thereof. As such, it should be understood that advantages, embodiments, examples, functional, features, logical, operational, organizational, structural, topological, and/or other aspects of the disclosure are not to be considered limitations on the disclosure as defined by the embodiments or limitations on equivalents to the embodiments. Depending on the particular desires and/or characteristics of an individual and/or enterprise user, database configuration and/or relational model, data type, data transmission and/or network framework, syntax structure, and/or the like, various embodiments of the technology disclosed herein may be implemented in a manner that enables a great deal of flexibility and customization as described herein.

All definitions, as defined and used herein, should be understood to control over dictionary definitions, definitions in documents incorporated by reference, and/or ordinary meanings of the defined terms.

As used herein, in particular embodiments, the terms "about" or "approximately" when preceding a numerical value indicates the value plus or minus a range of 10%. Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The indefinite articles "a" and "an," as used herein in the specification and in the embodiments, unless clearly indicated to the contrary, should be understood to mean "at least one."

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

Some embodiments and/or methods described herein can be performed by software (executed on hardware), hardware, or a combination thereof. Hardware modules may include, for example, a processor, a field programmable gate array (FPGA), and/or an application specific integrated circuit (ASIC). Software modules (executed on hardware) can include instructions stored in a memory that is operably coupled to a processor, and can be expressed in a variety of software languages (e.g., computer code), including C, C++, Java™ Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

The term "processor" should be interpreted broadly to encompass a general purpose processor, a central processing unit (CPU), a microprocessor, a digital signal processor (DSP), a controller, a microcontroller, a state machine and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

While specific embodiments of the present disclosure have been outlined above, many alternatives, modifications, and variations will be apparent to those skilled in the art. Accordingly, the embodiments set forth herein are intended to be illustrative, not limiting. Various changes may be made without departing from the spirit and scope of the disclosure.

The invention claimed is:

1. A method, comprising:
receiving, via a processor, identity provider (IDP)/single sign on (SSO) data from at least one of an IDP compute device or and an SSO compute device, the at least one of the IDP compute device or the SSO compute device managing access to a plurality of cloud-based applications for a plurality of user compute devices for a plurality of users;
receiving, via the processor and from the plurality of user compute devices, browser extension data, the browser extension data captured via a plurality of browser extensions at the plurality of user compute devices;
generating, via the processor and without accessing the plurality of cloud-based applications, analytics based on the IDP/SSO data and the browser extension data;
causing, via the processor, an action based on the analytics;
determining, via the processor, a remedial action to improve cybersecurity associated with the plurality of users and the plurality of user compute devices, based on the analytics; and
causing, via the processor, an indication of the remedial action to be displayed.

2. The method of claim 1, wherein the IDP/SSO data includes indications of:
for each cloud-based application from the plurality of cloud-based applications, users from the plurality of users using that cloud-based application.

3. The method of claim 1, wherein the plurality of users are included in a plurality of groups and the IDP/SSO data includes indications of:
for each cloud-based application from the plurality of cloud-based applications,
users from the plurality of users that have permission to access that cloud-based application and groups from the plurality of groups that have permission to access that cloud-based application.

4. The method of claim 1, wherein the IDP/SSO data includes indications of:
attributes associated with login attempts to the plurality of cloud-based applications by the plurality of users via the plurality of user compute devices.

5. The method of claim 1, wherein:
the plurality of users are members of a common entity, and each cloud-based application from the plurality of cloud-based applications used by the common entity.

6. The method of claim 1, wherein the analytics includes indications of for each cloud-based application from the plurality of cloud-based applications:
users from the plurality of users that are actively using that cloud-based application, and
users from the plurality of users that are not actively using that cloud-based application.

7. The method of claim 1, wherein the analytics includes indications of:
for each cloud-based application from the plurality of cloud-based applications,
failed login attempts to that cloud-based application by users from the plurality of users.

8. The method of claim 1, wherein the analytics includes indications of:
for each cloud-based application from the plurality of cloud-based applications,
users from the plurality of users using that cloud-based application that have multi-factor authentication enabled to access that cloud-based application.

9. The method of claim 1, wherein the analytics includes indications of:
for each cloud-based application from the plurality of cloud-based applications, users from the plurality of users using that cloud-based application that can access that cloud-based application without using multi-factor authentication.

10. The method of claim 1, wherein the analytics includes indications of:
for each user from the plurality of users,
cloud-based applications from the plurality of cloud-based applications that user has access to.

11. The method of claim 1, wherein the analytics includes indication of trends associated with activities performed by the plurality of users at the plurality of cloud-based applications.

12. The method of claim 1, further comprising:
receiving, via the processor and from an endpoint agency, a log,
the generating including generating the analytics based on the log.

13. An apparatus, comprising:
a memory; and
a processor operatively coupled to the memory and configured to:
receive first IDP/SSO data from at least one of a first IDP compute device or a first SSO compute device, the at least one of the first IDP compute device or the first SSO compute device configured to manage access to a first plurality of cloud-based applications for a first plurality of user compute devices for a first plurality of users;
receive, from the first plurality of user compute devices, browser extension data, the browser extension data captured via a plurality of browser extensions at the first plurality of user compute devices;
generate a first set of analytics based on the first IDP/SSO data and the browser extension data, the first set of analytics indicating that a user compute device from the first plurality of user compute devices is attempting to access a cloud-based application from the first plurality of cloud-based applications using an account predetermined as unacceptable to access the cloud-based application from the first plurality of cloud-based applications;
cause a first action based on the first set of analytics, the first action including preventing the user compute device from accessing the cloud-based application from the first plurality of cloud-based applications;
receive second IDP/SSO data that is (1) different than the first IDP/SSO data and (2) from at least one of a second IDP compute device or a second SSO compute device, the at least one of the second IDP compute device or the second SSO compute device managing access to a second plurality of cloud-based applications for a second plurality of user compute devices for a second plurality of users, the second plurality of cloud-based applications different than the first plurality of cloud-based applications, the second plurality of user compute devices different than the first plurality of user compute devices, the second plurality of users different than the first plurality of users;
generate a second set of analytics based on the second IDP/SSO data; and
cause a second action based on the second set of analytics.

14. The apparatus of claim 13, wherein the processor is further configured to:
receive third IDP/SSO data that is (1) different than the first IDP/SSO data and the second IDP/SSO data and (2) associated with a third IDP compute device and a third SSO compute device, the third IDP compute device and the third SSO compute device configured to manage access to a third plurality of cloud-based applications for a third plurality of user compute devices for a third plurality of users, the third plurality of cloud-based applications different than the first plurality of cloud-based applications and the second plurality of cloud-based applications, the third plurality of user compute devices different than the first plurality of user compute devices and the second plurality of compute devices, the third plurality of users different than the first plurality of users and the third plurality of users;
generate a third set of analytics based on the third IDP/SSO data; and
cause a third action based on the third set of analytics.

15. A non-transitory computer-readable medium having instructions stored thereon that, when executed by one or more processors, cause the one or processors to:
receive, from a plurality of user compute devices, browser extension data, the browser extension data (1) captured via a plurality of browser extensions at the plurality of user compute devices and (2) associated with the plurality of user compute devices attempting to access a plurality of cloud-based applications;
generate analytics based on the browser extension data, the analytics indicate that a user compute device from the plurality of compute devices is attempting to access a cloud-based application from the plurality of cloud-based applications flagged as unauthorized; and
cause an action within a network that includes the plurality of user compute devices based on the analytics, the action includes preventing the user compute device from accessing the cloud-based application.

\* \* \* \* \*